(12) United States Patent
Meier

(10) Patent No.: US 6,289,668 B1
(45) Date of Patent: Sep. 18, 2001

(54) ARRANGEMENT FOR THE SELECTIVE INTRODUCTION OF FUEL AND/OR WATER INTO COMBUSTION CHAMBER

(75) Inventor: Frank Meier, Zürich (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/315,996

(22) Filed: May 21, 1999

(30) Foreign Application Priority Data

May 25, 1998 (EP) .................................................. 98810488

(51) Int. Cl.⁷ ........................................................ F02G 3/14
(52) U.S. Cl. ............................................................. 60/39.55
(58) Field of Search .............................. 60/39.55, 39.26, 60/39.3, 734; 431/280; 137/625.41

(56) References Cited

U.S. PATENT DOCUMENTS

| 4,021,190 | * | 5/1977 | Diskson | ................................ | 431/280 |
| 6,080,679 | * | 6/2000 | Susuki | .................................. | 438/726 |

* cited by examiner

Primary Examiner—Timothy S. Thorpe
Assistant Examiner—William H Rodriguez

(74) *Attorney, Agent, or Firm*—Burns, Doane, Swecker & Mathis, L.L.P.

(57) ABSTRACT

An arrangement for the selective introduction of fuel and/or water into a combustion chamber, in particular the combustion chamber of a gas turbine, comprises valve means, by which a fuel feed line (18) for the fuel and a water feed line (19) for the water can be selectively connected to a common combustion-chamber feed line (17) leading to the combustion chamber, or the fuel feed line (18) and the water feed line (19) can be connected to one another for flushing the feed-line system, or the fuel feed line (18) and the water feed line (19) can be shut off individually. In such an arrangement, the number of movable parts is drastically reduced owing to the fact that the valve means comprise a combination valve (12), which can be shifted into at least five different valve positions, in which case only the fuel feed line (18) is connected to the combustion-chamber feed line (17) in the first valve position, only the water feed line (19) is connected to the combustion-chamber feed line (17) in the second valve position, the fuel feed line (18) and the water feed line (19) are connected simultaneously to the combustion-chamber feed line (17) in the third valve position, the fuel feed line (18) and the water feed line (19) are connected to one another and are separated from the combustion-chamber feed line (17) in the fourth valve position, and the fuel feed line (18) and the water feed line (19) are shut off individually in the fifth valve position.

9 Claims, 5 Drawing Sheets

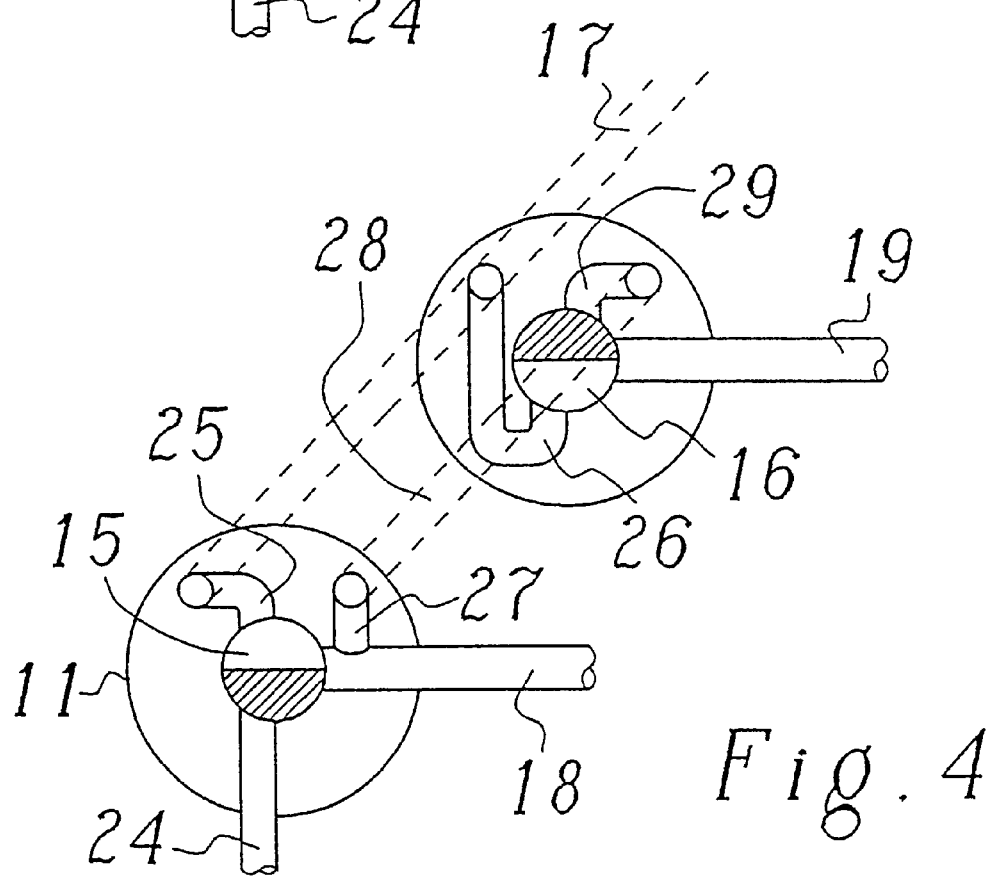

ARRANGEMENT FOR THE SELECTIVE INTRODUCTION OF FUEL AND/OR WATER INTO COMBUSTION CHAMBER

FIELD OF THE INVENTION

The present invention relates to the field of combustion technology, and more particularly to an arrangement for the selective introduction of fuel and/or water into a combustion chamber.

BACKGROUND OF THE INVENTION

In gas turbines as used for the generation of electrical energy in combined-cycle power stations or the like, in order to achieve favorable exhaust-gas values ("low NOx"), the procedure of spraying water into the associated combustion chamber together with the fuel (e.g. naphtha) is being increasingly adopted in order to reduce the temperature in the combustion chamber and thus prevent or make more difficult the formation of the undesirable nitrogen oxides. In large gas turbines, as manufactured, for example, by the applicant (e.g. of the type GT 13E2), a large, annular combustion chamber, in which a multiplicity of burners which can be activated individually are arranged (in an annular manner), is usually used for the combustion. Provided in this case for supplying the burners with the fuel and the water are burner lances which are each interchangeable and in whose interior space fuel and water and, if need be, also a pilot gas are fed in from outside to the burners. Here, fuel and water may be carried in separate lines and sprayed in separately, or may already be mixed at the entry to the lance to form an emulsion, which is then transmitted in a common line (in this respect see DE-A1-44 01 097 of the applicant).

In all cases, the burner lances are connected in each case at the entry side via separate feed-line valves to a fuel feed line and a water feed line, which are directed past the lance entries (lance heads) in an annular manner in order to supply all the lances. The feed-line valves permit the starting and shutdown of individual burners and at the same time control the mixture ratio of fuel to water. A further valve which connects the two feed lines to one another permits flushing of the fuel feed line by means of water from the water feed line. In addition, a venting valve is provided on the fuel ring main, and air (or water) located in the system can escape through this venting valve when the ring main is being filled with fuel.

Such a fuel distribution system accordingly has a number of valves which amount to a multiple of the number of burners or lances. Since each of these valves contains movable parts, in particular the susceptibility to faults and the maintenance costs, in addition to the plant costs, increase with the number of valves. In addition, individual activation of the valves requires complicated wiring and control logic.

SUMMARY OF THE INVENTION

Accordingly, one object of the invention is to develop an improved arrangement of the type mentioned above in such a way that the disadvantages of the previous arrangement are avoided and in particular increased reliability and simplified control are obtained.

The object is achieved by an arrangement of the type mentioned above in that the valve means comprise a combination valve, which can be shifted into at least five different valve positions, in which case only the fuel feed line is connected to the combustion-chamber feed line in the first valve position, only the water feed line is connected to the combustion-chamber feed line in the second valve position, the fuel feed line and the water feed line are connected simultaneously to the combustion-chamber feed line in the third valve position, the fuel feed line and the water feed line are connected to one another and are separated from the combustion-chamber feed line in the fourth valve position, and the fuel feed line and the water feed line are shut off individually in the fifth valve position. The essence of the invention consists in performing all the necessary valve functions with a single combination valve which can be shifted into different valve positions. Such a combination valve can be realized with only one movable part, so that a greatly reduced number of movable parts and thus considerably reduced susceptibility to faults results where there is a multiplicity of burners or burner lances.

In the arrangement according to the invention, the fuel feed line and the water feed line are connected simultaneously to the combustion-chamber feed line in the third valve position, so that fuel and water are directed to the combustion chamber. If the third valve position is fixed, a mixture ratio of fuel to water appears and this mixture ratio can be varied by a further valve being fitted into at least one of the feed lines. In a first preferred embodiment of the invention, in order to avoid the use of a further valve and to fully maintain the advantages achievable with the invention, the mixture ratio between water and fuel can be set within the third valve position by varying the valve position. The mixture ratio of fuel and water can thus also be set with the same combination valve.

A second preferred embodiment of the arrangement according to the invention is distinguished by the fact that a sixth valve position, in which the water feed line is shut off and the fuel feed line is simultaneously connected to a vent outlet, is provided. In this way, it is possible, without additional movable parts or valves, to vent the fuel feed line and fill it with fuel before the actual start of operation.

A further preferred embodiment of the invention is distinguished by the fact that the combination valve is designed as a rotary valve, and each of the valve positions corresponds to a predetermined rotary angle of the rotary valve, that the combination valve comprises a valve piston arranged so as to rotate about the longitudinal axis in a valve bore, that recesses or milled-out portions, which each form a valve chamber rotatable about the axis of rotation, are arranged one behind the other in the valve piston in the axis of rotation, and that the combustion-chamber feed line, the fuel feed line and the water feed line are connected to the valve bore in each case at the level of one of the valve chambers. The only movable part of the rotary valve is the rotary piston. The specific configuration of the rotary piston results in a very simple construction of the valve and high functional reliability.

It is especially favorable if, in a preferred development of this embodiment, the valve piston has two recesses or milled-out portions, which each form a valve chamber having a semicircular cross section, if the two valve chambers are arranged rotated through 180° relative to the axis of rotation, if the fuel feed line and the water feed line lead parallel to one another and one behind the other in the direction of the axis of rotation into the valve bore, the fuel feed line leading into the first valve chamber at a suitable rotary position of the valve piston, and the water feed line leading into the second valve chamber at a suitable rotary position of the valve piston, if a first combustion-chamber outlet branches off from the valve bore transversely to the fuel feed line in the region of the first valve chamber, if a second combustion-chamber outlet branches off from the valve bore in the opposite direction to the first combustion-chamber outlet in the region of the second valve chamber, if the two combustion-chamber outlets are connected to the combustion-chamber feed line, and if a further outlet branches off from the valve bore in the opposite direction to the second combustion-chamber outlet in the region of the second combustion chamber and is connected to a branch of the fuel feed line via a connecting line.

In principle, different drives may be used for the actuation of the rotary valve; the individual rotary positions or valve positions may then be defined by appropriate catch mechanisms. However, it is especially simple and advantageous if, in another preferred embodiment, a stepping motor is provided in order to actuate the combination valve or rotary valve, by means of which stepping motor the valve can be rotated and certain predetermined rotary positions can be reliably activated at the same time.

It is especially space-saving if, in a further preferred embodiment, the combustion-chamber feed line is directed inside a burner lance into the combustion chamber, the burner lance has a lance head at its end remote from the combustion chamber, and the combination valve is accommodated in the lance head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic representation of the valve of FIG. 2 in a first position;

FIG. 4 is a schematic representation of the valve of FIG. 2 in a second position;

DESCRIPTION OF THE PREFERRED EMBODIMENTS

Figure 1:
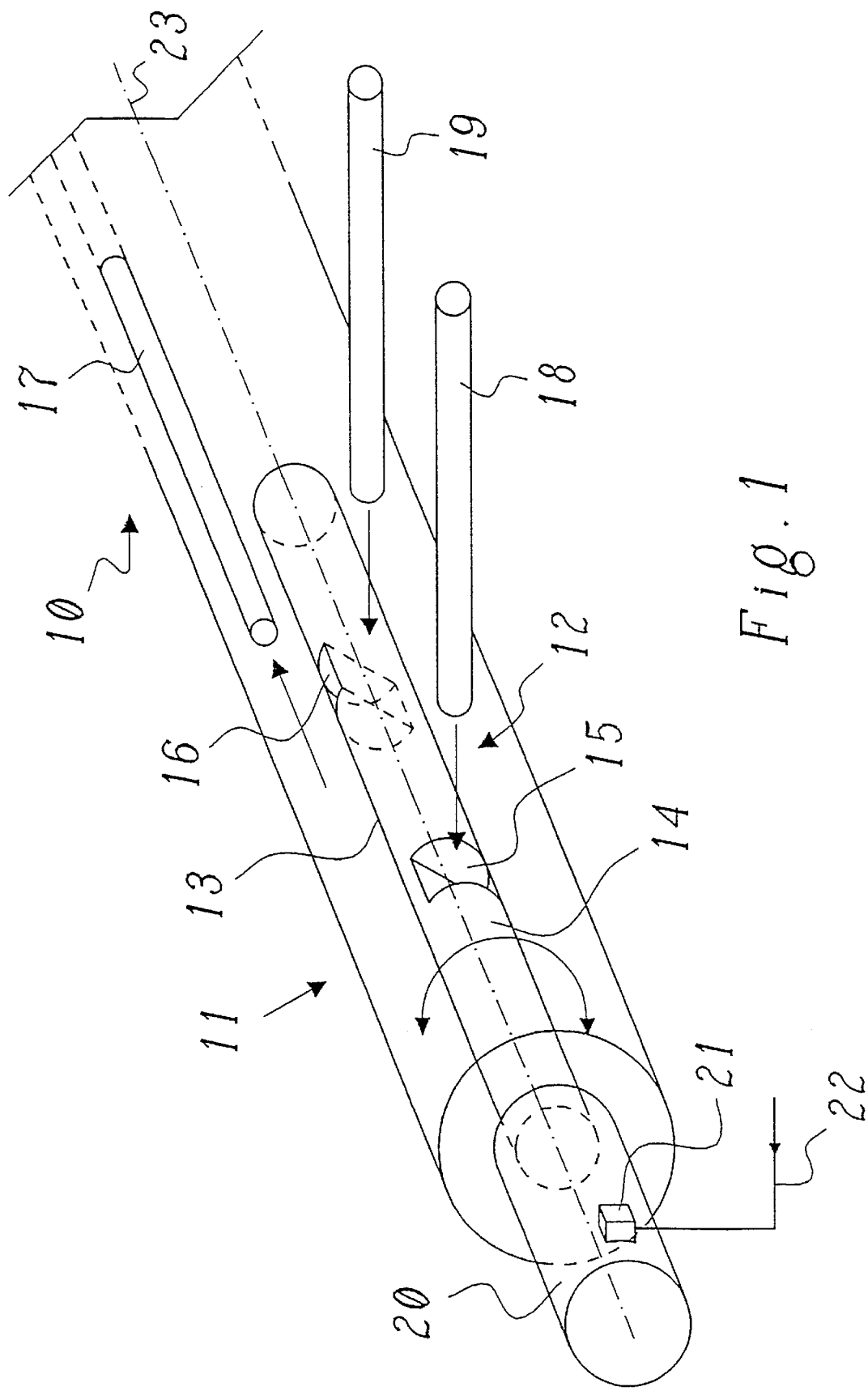
FIG. 1 shows a preferred of embodiment for a combination valve according to the invention accommodated in a lance head.

Referring now to the drawings, wherein like reference numerals designate identical or corresponding parts throughout the several views, in FIG. 1 a preferred exemplary embodiment for a combination valve according to the invention accommodated in a lance head of a burner lance is reproduced in a simplified perspective representation. The burner lance 10 extends along a lance axis 23 from a lance head 11 located outside the combustion chamber right into the burner arranged in the combustion chamber (neither is shown in FIG. 1). The liquid fuel (oil or naphtha) is fed in to the burner lance 10 in a fuel feed line 18. The water is correspondingly fed in in a water feed line 19. By means of a combination valve 12 accommodated in the lance head 11, fuel and/or water, depending on the valve position, are selectively introduced into a combustion-chamber feed line 17, which runs toward the lance tip (not shown) in the burner lance 10 parallel to the lance axis 23. The direction of the liquid flows in the region of the valve is symbolized in FIG. 1 by arrows. The line connections inside the combination valve 12, which are important for the valve function, are not depicted in FIG. 1 for the sake of clarity and are explained in more detail below in connection with the schematic representation from FIG. 2.

Essential for the function of the combination valve 12 is a cylindrical valve piston 14, which is arranged so as to rotate (about the lance axis 23) in a corresponding valve bore 13 in the lance head 11. To seal off the valve piston 14 in the valve bore 13, sealing means, such as, for example, O-rings or the like, may be provided. However, such sealing means have not been shown for the sake of simplicity. Arranged in the valve piston 14 one behind the other in the axis of rotation are recesses or milled-out portions, which each form a valve chamber 15, 16 rotatable about the axis of rotation 23 and having a semicircular cross section. The two valve chambers 15, 16 are arranged rotated through 180° relative to the axis of rotation 23. The fuel feed line 18 and the water feed line 19 lead parallel to one another and one behind the other in the direction of the axis of rotation 23 into the valve bore 13, the fuel feed line 18 leading into the first valve chamber 15 at a suitable rotary position of the valve piston 14 (as shown in FIG. 1), and the water feed line 19 leading into the second valve chamber 16 at a suitable rotary position of the valve piston 14 (contrary to the case shown in FIG. 1). The combustion-chamber feed line 17 is connected to the valve bore 13 at the level of both valve chambers 15, 16. The valve piston 14 can be rotated about the axis of rotation 23 through 360° into different valve positions. A stepping motor 20 sitting in the axis of rotation 23 is provided in order to actuate the valve piston, and this stepping motor 20 is activated via a control circuit 21 and receives its control signals via a signal line 22.

Figure 2:
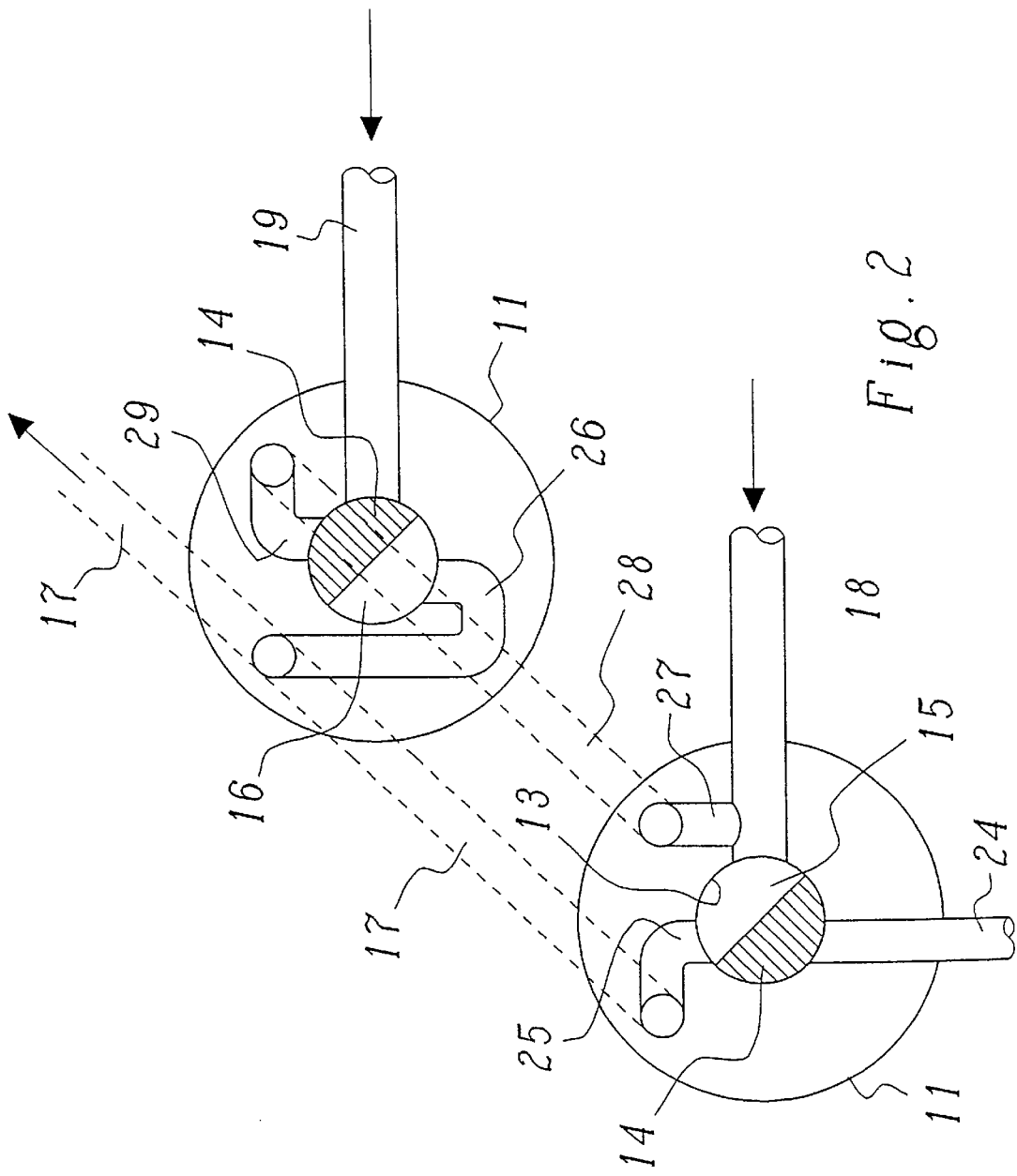
FIG. 2 is a schematic perspective representation, which shows cross sections in the center plane of the two valve chambers.

The line connections inside the combination valve 12, which are important for the valve function and are omitted in FIG. 1, can be seen from the schematic (perspective) representation in FIG. 2. The bottom (front) part of FIG. 2 shows the cross section through the lance head 11 from FIG. 1 in the center plane passing through the valve chamber 15. The top (rear) part of FIG. 2 correspondingly shows the cross section in the center plane passing through the second valve chamber 16. The fuel feed line 18 leads from the right into the valve bore 13 or the first valve chamber 15 respectively. The water feed line 19 running behind it leads in the region of the second valve chamber 16 into the valve bore 13 but is closed by the (hatched) valve piston 14 in the valve position shown in FIG. 2.

A first combustion-chamber outlet 25 branches off upward from the valve bore 13 transversely to the fuel feed line 18 in the region of the first valve chamber 15 and is connected to the combustion-chamber feed line 17 (depicted by broken lines) leading to the burner. The first combustion-chamber outlet 25 is offset slightly to the left, so that it is closed by the valve piston 14 in a valve position in which the base of the first valve chamber 15 is perpendicular and the first valve chamber 15 is open toward the fuel feed line 18. Furthermore, a vent outlet 24 branches off downward from the valve bore 13 transversely to the fuel feed line 18. The vent outlet 24 is offset slightly to the left, so that it is closed by the valve piston 14 in a valve position in which the base of the first valve chamber 15 is perpendicular and the first valve chamber 15 is open toward the fuel feed line 18.

A second combustion-chamber outlet 26 branches off downward from the valve bore 13 transversely to the water feed line 19 in the region of the second valve chamber 16 and is likewise connected to the combustion-chamber feed line 17. The second combustion-chamber outlet 26 is likewise offset slightly to the left, so that it is closed by the valve piston 14 in a valve position in which the base of the second valve chamber 16 is perpendicular and the second valve chamber 16 is open toward the water feed line 19. Furthermore, an outlet 29 branches off upward from the valve bore 13 to the water feed line 19 in the region of the second valve chamber 16 and is connected to a branch 27 from the fuel feed line 18 via a connecting line 28 (depicted by broken lines). The outlet 29 is offset slightly to the right, so that it is likewise closed by the valve piston 14 in a valve position in which the base of the second valve chamber 16 is perpendicular and the water feed line 19 is closed.

With the configuration of the combination valve 12 described, all the necessary valve functions for the burner lance can now be realized by means of suitable valve positions (rotary positions). The different valve positions are shown in FIGS. 3–8 and the associated valve functions are to be explained below:

In the valve position shown in FIG. 3, which corresponds to the valve position from FIG. 2, the fuel feed line 18 is fully connected to the combustion-chamber feed line 17 via the first valve chamber 15. The water feed line 19, on the other hand, is closed. The same applies to the outlet 29 or the connecting line 28 respectively. In this valve position, therefore, only liquid fuel is sprayed into the combustion chamber.

In the valve position shown in FIG. 4, which results from the valve position of FIG. 3 by rotating the valve piston counter-clockwise through 45°, both the vent outlet 24 and the outlet 29 to the connecting line 28 are closed. On the other hand, both the fuel feed line 18 and the water feed line 19 are partly open, i.e. both fuel and water flow via the valve chambers 15 and 16 respectively into the combustion-chamber feed line 17. In this case, the mixture ratio of fuel to water is determined by the fine setting of the valve piston 14. In the position shown in FIG. 4, fuel and water flow in equal proportions into the combustion-chamber feed line. On the other hand, if the valve piston is rotated clockwise, the passage from the water teed line 19 is throttled to a greater extent, whereas the passage from the fuel feed line 18 is opened to a greater extent. The proportion of fuel in the fuel/water mixture thus increases. If the valve piston 14 is adjusted counterclockwise, the mixing ratio changes in the opposite manner. In the process, the accurate setting of the mixture ratio is made possible by the precise adjustability by means of the stepping motor 20.

Figure 5:
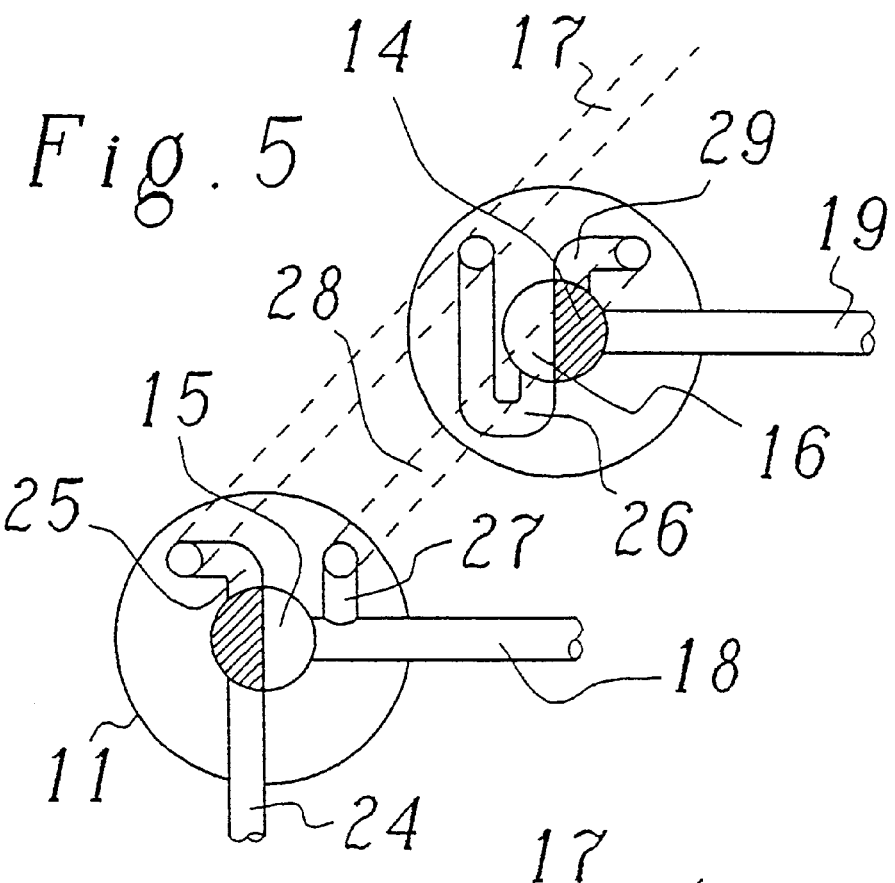
FIG. 5 is a schematic representation of the valve of FIG. 2 in a third position.

In the valve position shown in FIG. 5, which results from the valve position according to FIG. 3 by rotating the valve piston 14 clockwise through 45°, the water feed line 19 and the outlet 29 are closed. Likewise, the connection from the fuel feed line 18 to the first combustion-chamber outlet 25 and to the vent outlet 24 is interrupted. This valve position is effective when the burner is shut off: the combustion-chamber feed line 17, the fuel feed line 18 and the water feed line 19 are closed or interrupted per se.

Figure 6:
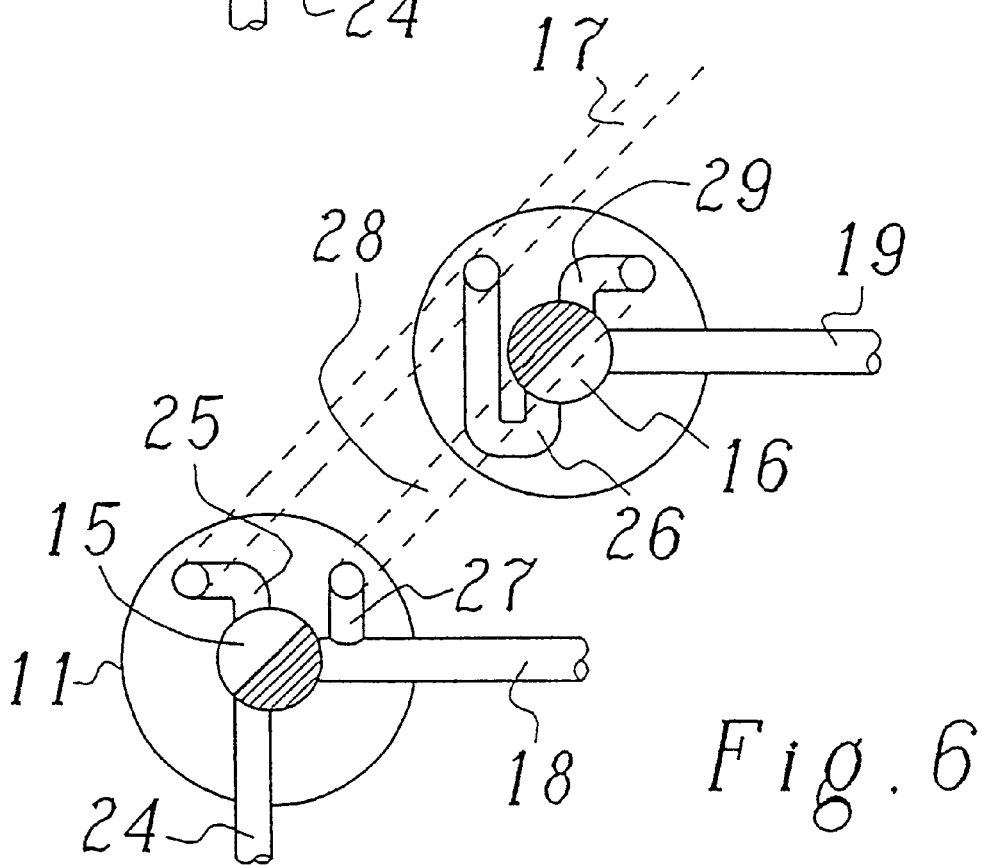
FIG. 6 is a schematic representation of the valve of FIG. 2 in a fourth position.

In the valve position shown in FIG. 6, which results from the valve position according to FIG. 4 by rotating the valve piston 14 counterclockwise through 45°, only the water feed line 19 is fully connected to the combustion-chamber feed line 17 via the second valve chamber 16. All the other connections are interrupted. In this valve position, the burner lance 10 can be flushed with water up to the burner-side outlet in order to remove fuel residues.

Figure 7:
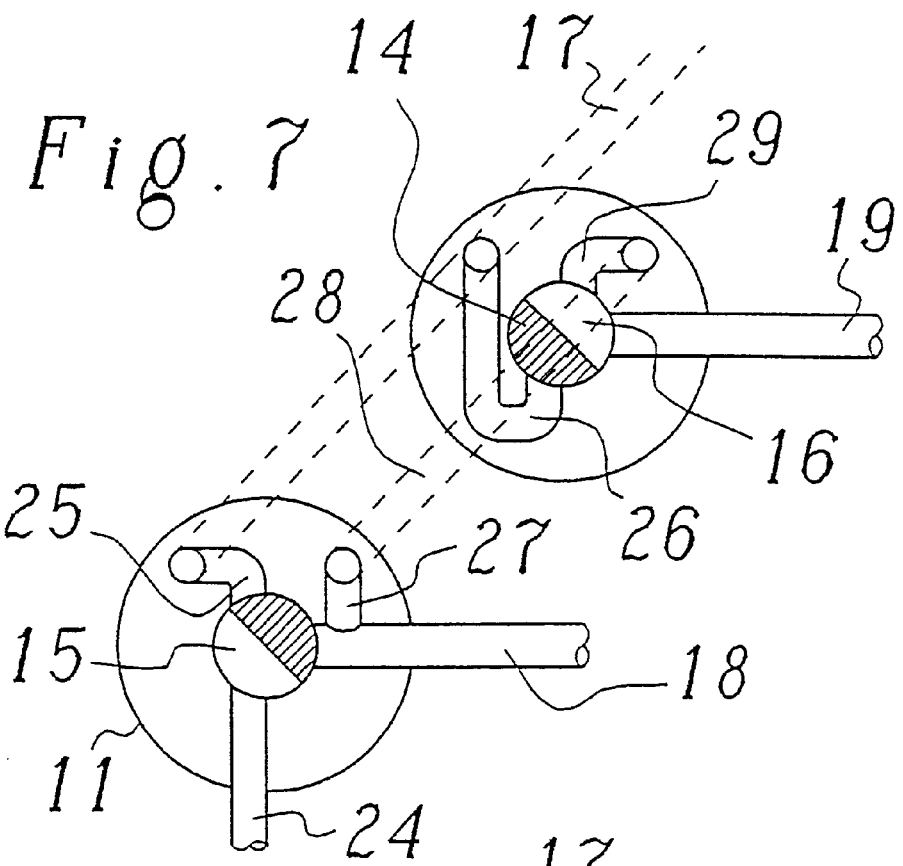
FIG. 7 is a schematic representation of the valve of FIG. 2 in a fifth position.

In the valve position shown in FIG. 7, which results from the valve position according to FIG. 3 by rotating the valve piston 14 through 180°, the combustion-chamber feed line 17 is closed. On the other hand, the water feed line 19 is connected to the fuel feed line 18 via the outlet 29 and the connecting line 28. In this valve position, the (annular) fuel feed line 18 can be flushed and cleaned in the reverse direction with water from the water feed line 19.

Figure 8:
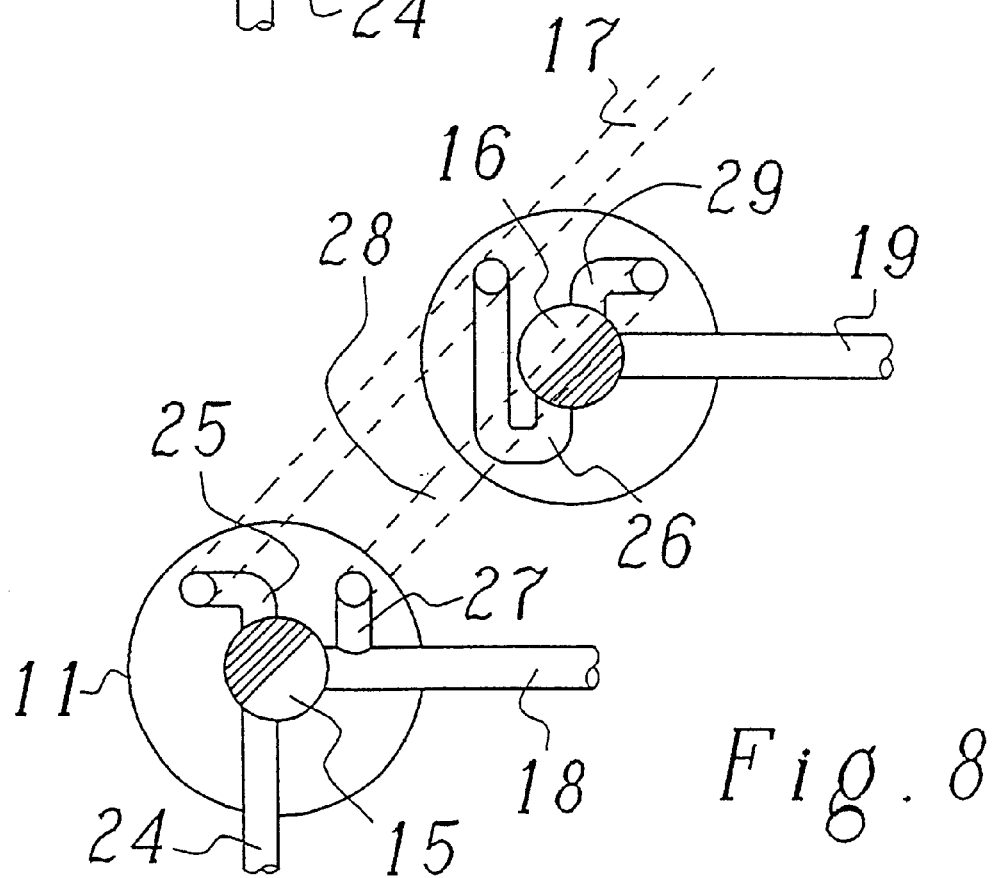
FIG. 8 is a schematic representation of the valve of FIG. 2 in a sixth position.

Finally, in the valve position shown in FIG. 8, which results from the valve position according to FIG. 6 by rotating the valve piston 14 through 180°, the combustion-chamber feed line 17 and the water feed line 19 are closed, whereas the fuel feed line 18 is connected to the vent outlet 24 via the first valve chamber 15. In this valve position, the fuel feed line 18 can be filled with fuel and vented at the same time, so that the fuel distribution system is already completely filled with fuel at the start of operation.

On the whole, the invention results in an arrangement for the selective introduction of fuel and/or water into a combustion chamber which has the following advantages:

by means of a combination valve having only one movable part (the valve piston), six different valve functions which are important for the operation of the arrangement are realized in a simple and operationally reliable manner by at least six different valve positions by means of a positionally accurate valve drive (e.g. stepping motor), the mixture ratio of fuel to water can be set at the same time in one valve position in this way, the mixture ratio can be set individually for each burner or burner lance the combination valve with the drive can be integrated in the head of a burner lance in a simple and space-saving manner.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An arrangement for the selective introduction of fuel, water, or both into a combustion chamber comprising:
   a valve by which a fuel feed line for the fuel and a water feed line for the water can be selectively connected to a common combustion-chamber feed line leading to the combustion chamber, or the fuel feed line and the water feed line can be connected to one another for flushing the feed-line system, or the fuel feed line and the water feed line can be shut off individually, wherein the valve comprises a combination valve, which can be shifted into at least five different valve positions, including:
   a first valve position wherein only the fuel feed line is connected to the combustion-chamber feed line;
   a second valve position wherein only the water feed line is connected to the combustion chamber feed line;
   a third valve position wherein the fuel feed line and the water feed line are connected simultaneously to the combustion-chamber feed line;
   a fourth valve position wherein the fuel feed line and the water feed line are connected to one another and are separated from the combustion-chamber feed line; and
   a fifth valve position wherein both the fuel feed line and the water feed line are shut off.

2. The arrangement as claimed in claim 1, wherein a mixture ratio between water and fuel can be set within the third valve position by varying the valve position.

3. An arrangement for the selective introduction of fuel and/or water into a combustion chamber, in particular the combustion chamber of a gas turbine, which arrangement comprises valve means, by which a fuel feed line for the fuel and a water feed line for the water can be selectively connected to a common combustion-chamber feed line leading to the combustion chamber, or the fuel feed line and the water feed line can be connected to one another for flushing the feed-line system, or the fuel feed line and the water feed line can be shut off individually, wherein the valve means comprise a combination valve, which can be shifted into at least six different valve positions, in which case only the fuel feed line is connected to the combustion-chamber feed line in the first valve position, only the water feed line is connected to the combustion-chamber feed line in the second valve position, the fuel feed line and the water feed line are connected simultaneously to the combustion-chamber feed line in the third valve position, the fuel feed line and the water feed line are connected to one another and are separated from the combustion-chamber feed line in the fourth valve position, and the fuel feed line and the water feed line are shut off individually in the fifth valve position and in the sixth valve position, the water feed line is shut off and fuel feed line is simultaneously connected to a vent outlet.

4. The arrangement as claimed in claim 1, wherein the combination valve (12) is designed as a rotary valve, and each of the valve positions corresponds to a predetermined rotary angle of the rotary valve.

5. An arrangement for the selective introduction of fuel and/or water into a combustion chamber, in particular the combustion chamber of a gas turbine, which arrangement comprises valve means, by which a fuel feed line for the fuel and a water feed line for the water can be selectively connected to a common combustion-chamber feed line leading to the combustion chamber, or the fuel feed line and the water feed line can be connected to one another for flushing the feed-line system, or the fuel feed line and the water feed line can be shut off individually, wherein the valve means comprise a combination valve, which can be shifted into at least five different valve positions, in which case only the fuel feed line is connected to the combustion-chamber feed line in the first valve position, only the water feed line is connected to the combustion-chamber feed line in the second valve position, the fuel feed line and the water feed line are connected simultaneously to the combustion-chamber feed line in the third valve position, the fuel feed line and the water feed line are connected to one another and are separated from the combustion-chamber feed line in the fourth valve position, and the fuel feed line and the water feed line are shut off individually in the fifth valve position the combustion valve including a valve piston arranged so as to rotate about the longitudinal axis in a valve bore, wherein recesses each form a valve chamber rotatable about the axis of rotation, the recesses being arranged one behind the other in the valve piston along the axis of rotation, and wherein the combustion-chamber feed line, the fuel feed line and the water feed line are connected to the valve bore in each case at the level of one of the valve chambers.

6. The arrangement as claimed in claim 5, wherein the valve piston has two recesses which each form a valve chamber having a semicircular cross section, wherein the two valve chambers are arranged rotated through 180° relative to the axis of rotation, wherein the fuel feed line and the water feed line lead parallel to one another and one behind the other in the direction of the axis of rotation into the valve bore, the fuel feed line leading into the first valve chamber at a suitable rotary position of the valve piston, and the water feed line leading into the second valve chamber at a suitable rotary position of the valve piston, wherein a first combustion-chamber outlet branches off from the valve bore transversely to the fuel feed line in the region of the first valve chamber, wherein a second combustion-chamber outlet branches off from the valve bore in the opposite direction to the first combustion-chamber outlet in the region of the second valve chamber, wherein the two combustion-chamber outlets are connected to the combustion-chamber feed line, and wherein a further outlet branches off from the valve bore in the opposite direction to the second combustion-chamber outlet in the region of the second combustion chamber and is connected to a branch of the fuel feed line via a connecting line.

7. The arrangement as claimed in claim 6, wherein a vent outlet branches off from the valve bore in the opposite direction to the first combustion-chamber outlet in the region of the first valve chamber.

8. The arrangement as claimed in claim 1, wherein the combustion-chamber feed line is directed inside a burner lance into the combustion chamber, wherein the burner lance has a lance head at its end remote from the combustion chamber, and wherein the combination valve is accommodated in the lance head.

9. The arrangement as claimed in claim 8, wherein the combination valve is a rotary valve, and wherein the axis of rotation of the rotary valve is parallel to the lance axis of the burner lance.

* * * * *